United States Patent
Yao et al.

(10) Patent No.: US 7,109,608 B2
(45) Date of Patent: Sep. 19, 2006

(54) ADVANCED SMOOTH TRANSITION SWITCH

(75) Inventors: Yixin Yao, Ann Arbor, MI (US); Bing Zheng, Dublin, OH (US); Mary Yi-Yang Huang, Troy, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 447 days.

(21) Appl. No.: 10/241,124

(22) Filed: Sep. 11, 2002

(65) Prior Publication Data

US 2004/0046522 A1 Mar. 11, 2004

(51) Int. Cl.
*H01H 9/54* (2006.01)
*G05B 11/42* (2006.01)
*G05B 13/02* (2006.01)

(52) U.S. Cl. .............. 307/112; 307/139; 318/609; 700/41

(58) Field of Classification Search .......... 307/139, 307/112; 318/609; 700/41
See application file for complete search history.

(56) References Cited

U.S. PATENT DOCUMENTS

| | | | |
|---|---|---|---|
| 3,655,992 A | 4/1972 | Ohno et al. | |
| 3,694,633 A | 9/1972 | Lejon | |
| 3,772,602 A | 11/1973 | Kobayashi | |
| 3,940,594 A | 2/1976 | Bleak et al. | |
| 4,141,065 A | 2/1979 | Sumi et al. | |
| 4,234,832 A | 11/1980 | Dreinhoefer et al. | |
| 4,268,784 A * | 5/1981 | Ganaway | 318/610 |
| 4,458,189 A | 7/1984 | Dollerschell | |
| 4,494,208 A | 1/1985 | Chang | |
| 4,509,000 A | 4/1985 | Ferguson | |
| 4,587,474 A | 5/1986 | Espelage et al. | |
| 4,941,087 A | 7/1990 | Kap | |
| 5,195,027 A | 3/1993 | Breckner | |
| 5,490,058 A | 2/1996 | Yamasaki et al. | |
| 5,986,422 A | 11/1999 | Iwashita et al. | |
| 6,084,371 A * | 7/2000 | Kress et al. | 318/566 |
| 6,329,776 B1 | 12/2001 | Bixel et al. | |

* cited by examiner

*Primary Examiner*—Brian Sircus
*Assistant Examiner*—Hal I. Kaplan
(74) *Attorney, Agent, or Firm*—Dickinson Wright PLLC

(57) ABSTRACT

A bi-directional smooth transition switch with bumpless transfer is disclosed. It is composed of two feedback loops, each with feedback and forward-loop compensators. During loop operation, one feedback loop is active, while the other is inactive. The smooth transition switch operates in the following manner. The switch output is measured. Next, an error signal is formed as the difference between the forward-loop compensator output and the switch output, which is fed to the input of a high gain feedback compensator. The output of the feedback compensator is a feedback signal. When no switching occurs, the feedback signal remains zero in the active loop, and the output signal of the inactive loop will track the output signal of the active loop. When the switchover occurs, the inactive loop will replace the original active loop and provide smooth transition switch's output.

12 Claims, 4 Drawing Sheets

PRIOR ART

ADVANCED SMOOTH TRANSITION SWITCH

FIELD OF THE INVENTION

The present invention is related generally to the field of industrial switches and more particularly to the field of smooth transition switches.

BACKGROUND OF THE INVENTION

Switches are very popular components used in various industrial fields. Industrial process systems and devices often require switching among alternative modes or controllers to satisfy multiple optimal objectives. Such examples include switching from manual to automatic control states. Other examples include switching from one controller, such as a proportional controller, to another controller, such as a proportional-integrate controller for a process.

When switching between controllers or modes (switchover), the difference between the outputs of different controllers or modes produces a discontinuous bump in the process input. This, in turn, causes undesirable bumps in the controlled output variables. This difference or mismatch can deeply deteriorate the performance of the process. Such phenomenon is referred to as the bump transfer. The issue of avoiding process bump transfer is one of the most important issues in industry processes. A goal of switching is to realize a smooth transition of bumpless transfer between different controllers or process operating modes. Technology used to realize a smooth transition is referred to as bumpless transfer technology.

The purpose of bumpless transfer is to keep the control signal sent into the controlled plant continuous when the switching occurs. Most current bumpless transfer control devices in use today rely on the operating information of the system or specific system design technology. This method requires a designer to know the process mode or the controller states. Thus, it requires the controller states to always be computable. Therefore, it is a challenge for bumpless transfer devices to be applied in different processes and different areas of the industry. Another challenge for bumpless transfer devices is to be used easily by people who are not familiar with a special system or process.

SUMMARY OF THE INVENTION

The invention includes a smooth transition switch with bumpless transfer, comprising a switch with a control input, a first signal input, a second signal input and an output. In addition, the smooth transition switch also has a first feedback loop operably connected to the first signal input and the output of the switch, and a second feedback loop operably connected to the second signal input and the output of the switch.

In another embodiment, at least one of the feedback loops in the transition switch includes a summing junction having a plurality of inputs and at least one output operably connected to the first signal input of the switch. The loop also has a forward-loop compensator operably connected between the output of the summing junction and the first signal input of the switch. In addition, the loop has a comparator with a first input operably connected to an output of the forward-loop compensator and a second input operably connected to the output of the switch.

In yet another embodiment, the invention is directed to a method of smooth transition switching including the steps of reading a control signal, reading a plurality of input signals, reading at least one feedback signal, and generating at least one error signal. The method further includes forward-loop compensating the at least one error signal, and generating at least one input command signal for the switch. Furthermore, an output command signal is switched to the at least one input command signal. Next, another error signal is calculated and then feedback compensated. Finally, at least one feedback signal is generated from the compensated error signal.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

The present invention comprises a bi-directional smooth transition switch with bumpless transfer which does not rely on system or controller models. Furthermore, specialized knowledge of the system is not required to operate the bi-directional smooth transition switch. Applications for the bi-directional smooth transition switch include the automobile industry, the aerospace industry, power electronics and the chemical industry.

Figure 1:
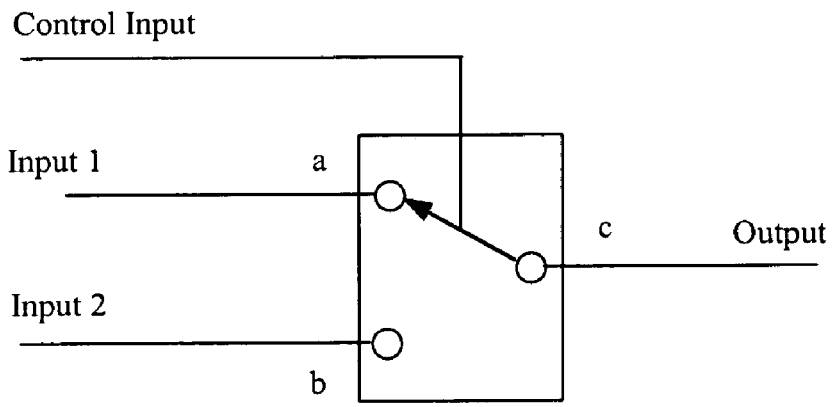
FIG. 1 shows a block diagram of a conventional switch.

FIG. 1 shows a block diagram of a conventional switch. It is a double throw, single pole switch. A control signal input at the control terminal connects the output terminal to either input terminal 1 or 2. Assuming that input terminal 1 is connected to the output terminal, a signal on the control terminal would cause the input at input terminal 2 to be connected to the output terminal. If the value of the input at input 1 is not equal to the value at input 2, a jump in the output signal will occur when switching from input 1 to input 2. This jump represents a difference between the current and the desired output signal when the switchover is effected. This will cause a bump in the process being controlled.

Figure 2:
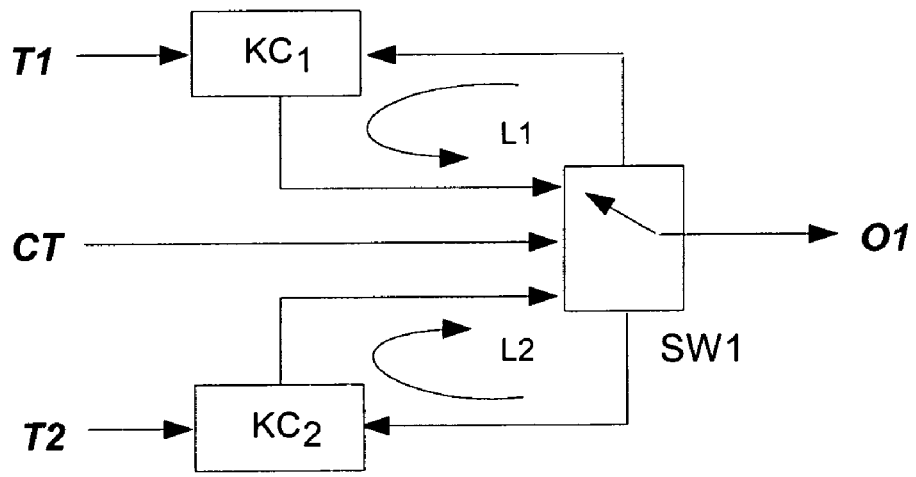
FIG. 2 is a simplified block diagram of the bi-directional smooth transition switch in the present invention comprising two feedback loops.

FIG. 2 is an illustrated block diagram of the bi-directional smooth transition switch in the present invention. The differences between the inputs and the output of the switch are fed back to the inputs through dynamic compensators KC1 and KC2 to form two feedback loops L1, L2. The parameters KC1 and KC2 are chosen to optimize the switch's dynamic response characteristics.

When the control terminal CT causes switching from input terminals T1 and T2, the output O1 response of the switch SW1 will be controlled by the feedback loop so as to minimize the jump in the output signal. Thus, the present invention utilizes feedback compensation to compensate for sudden signal changes. In a preferred embodiment, the compensation includes two feedback loops, L1, L2. Thus, by minimizing any effects caused by switching, the output signal will be kept continuous and smooth.

Figure 3:
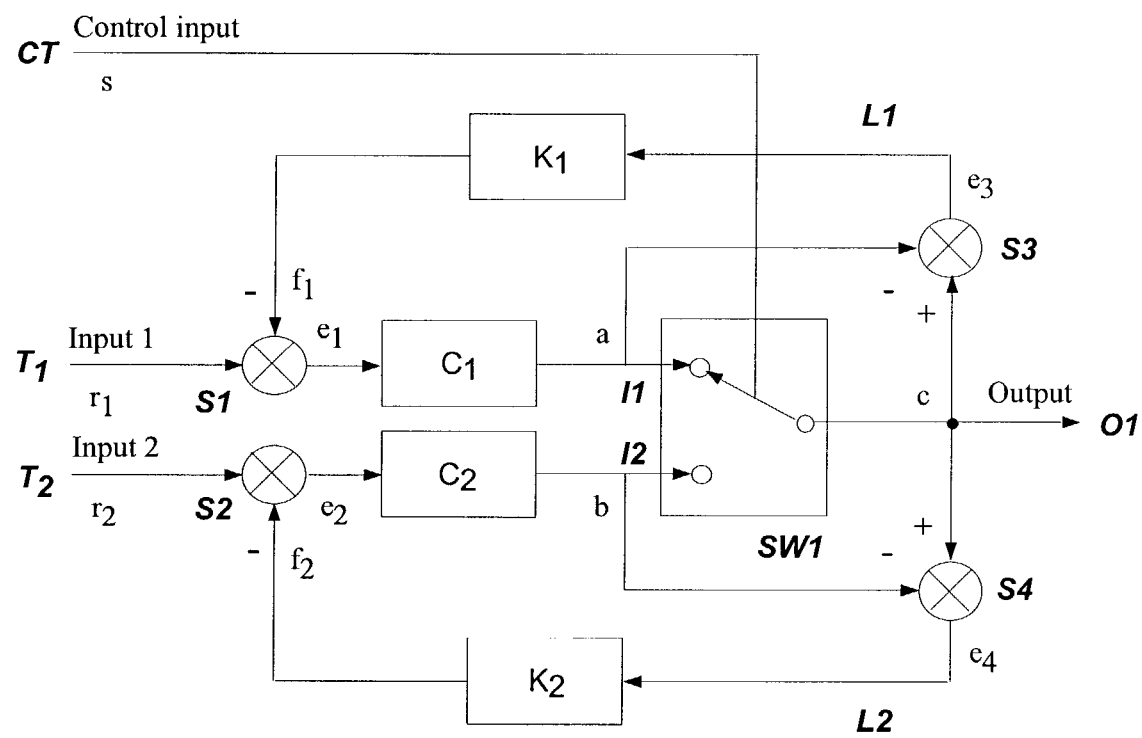
FIG. 3 is a block diagram of the bi-directional smooth transition switch in the present invention.

The block diagram of the smooth transition switch of the present invention is shown in FIG. 3. Two feedback loops are formed from two input reference signals r1, r2 in the input terminal T1, T2 to output signal c in the output terminal O1 with the compensators K1, K2 and forward-loop compensators (or forward compensators) C1, C2. At input terminal T1, input signal r1 is input to summing junction or summer S1. Similarly, at input terminal T2, an input signal r2 is input to summing junction S2. Feedback signals f1, f2 are subtracted from the input reference signals r1, r2 in the summing junctions S1 and S2 respectively to form the error signals e1, e2. Error signals e1, e2 are passed through corresponding forward-loop compensators C1, C2, respectively, forming command signals a, b respectively.

Command signal a is input to input I1 of switch SW1 and to summing junction S3. Similarly, command signal b is input to input I2 of switch SW1 and to summing junction S4. A switch control signal s, input at the control terminal CT, is connected to the control input of switch SW1. The output of switch SW1, O1, comprises output command signal c which is input to both summing junctions S3 and S4. The switch control signal s controls which input of switch SW1, I1 or I2, is connected to the output of switch SW1, O1, and thus determines which command signal, a or b, is output as command signal c.

As stated earlier, the difference between the inputs and the output of the switch SW1 is fed back to the inputs through feedback compensators K1 and K2 to form two feedback loops L1, L2. In summing junction S3, command signal a is subtracted from command signal c producing error signal e3. Error signal e3 is then passed through feedback compensator K1 creating feedback signal f1 which is input to summing junction S1. Similarly, in summing junction S4, command signal b is subtracted from command signal c producing error signal e4. Error signal e4 is then passed through feedback compensator K2 creating feedback signal f2 which is input to summing junction S2.

Comparing this smooth transition switch with a conventional switch in the same condition, assume that switch SW1 input I1 with signal a is connected to switch SW1 output O1 with signal c before switching. There is no difference between signal a and signal c in this case. That is, command signal a=output signal c, a=c. As a result, the error signal e3=c−a. Consequently, the feedback signal f1 is equal to zero. Thus, the input signal r1 is forwarded to output signal c directly. Because the switch is on in this loop, this loop, L1, that consists of error signal e3=c−a, feedback compensator K1, error signal e1=r1−f1 and forward-loop compensator C1, is called the active loop.

When L1 is the active loop, the other loop, L2, is off and is call the inactive loop. It consists of error signal c4=c−b, feedback compensator K2, error signal e2=r2−f2, and froward-loop compensator C2. In the same period of time that the active loop is on, the inactive loop will generate an error signal c2=r2−f2 and feedback error signal c4=c−b. By the suitable choice for the parameters of compensators K2, C2, the input signal b of switch SW1 will be forced to track the signals a and c in the active loop L1.

When switching from I1 with signal a to I2 with signal b, the inactive loop L2 will replace the original active loop L1 to be the active loop in the smooth transition switch of the present invention. The response of command signal b of switch SW1 will be controlled by the present active feedback loop L2 such that the bump in the output signal c is controlled when output O1 of the switch with command signal c is switched from I1 with signal a to I2 with signal b. Since the output of present active loop L2 is always tracking the original active loop L1 before switching, the inactive loop becomes the active loop without an abrupt bump. As a result, the smooth transition switch output, output signal c, will remain in a continuous state, thus ensuring that the output control signal used to control a plant is continuous when the switching occurs.

In the same period of time, the original active loop, L1, becomes the inactive loop. It will generate an error signal e1=r1−f1 and feedback error signal e3=c−a. By the suitable choice for the parameters of compensators K1, C1, the input signal a of switch SW1 will be forced to track signals b and c in at the current active loop L2.

Therefore, the bump incurred during switchover between two input signals is minimized when the smooth transition switch is applied in processes and devices. In other words, the smooth transition switch introduces feedback control to compensate for the sudden signal changes during switchover. As a result, the output of the switch will be kept continuous and smooth, and effect of switching is minimized.

The parameters of two feedback compensators K1, K2 and forward-loop compensators C1, C2 can be chosen to control the dynamic response characteristics. In a preferred embodiment, the principle of parameter choice used is to track the output signal of the active loop in the smooth transition switch of the present invention. Thus, parameters can be chosen empirically. Generally, the compensators K1, K2 can be chosen to have high constant gains such that the error signal e3, e4 are reduced to zero quickly.

The forward-loop compensators C1, C2 can be chosen to be simple proportional-integrate compensators. In addition, they can be chosen to have a general compensator form with a transfer function of $C(s)=(b1*s+b0)/(a1*s+1)$ where the coefficients a1, and b0, b1 are constant coefficients and s is the switch control signal.

This method of the smooth transition switch is based on measuring or estimating the actual switch output variable c. It can be realized by using suitable sensor measurement technology or state estimation technology to obtain the solution for output signal c.

Generally, the mismatching that can occur during switchover between the process input and the controller output can produce very detrimental effects in the industrial process. This can occur when switching from manual to automatic control and switching between two controllers in parallel. The switching apparatus and method of the present invention can keep the control signal transmitted into the controlled plant or process continuous when the switching occurs. Thus, this invention for a smooth transition switch is a very significant improvement for industrial processes and devices.

Figure 4:
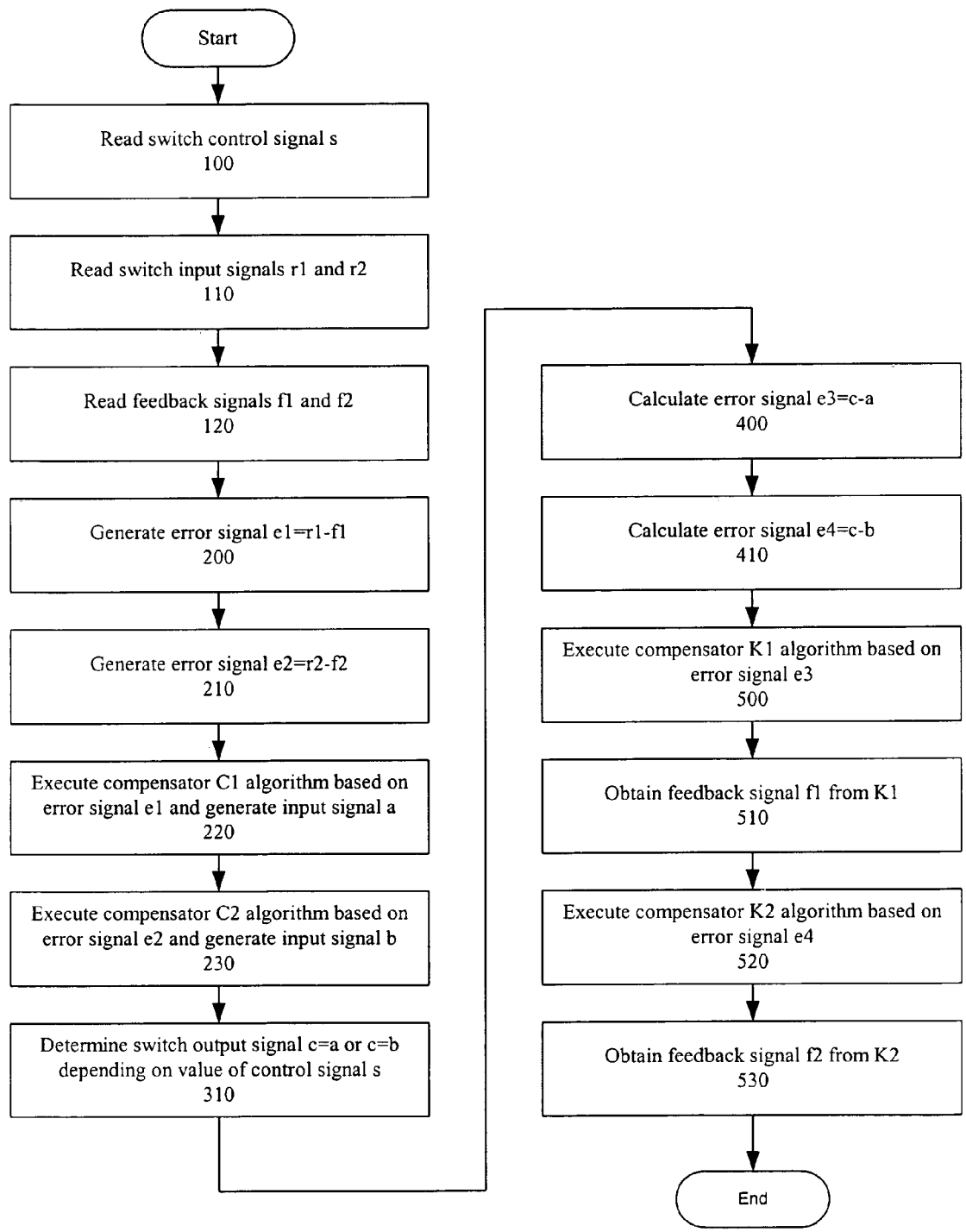
FIG. 4 is a flowchart which discloses the steps taken by the present invention when switching between control (or command) signals.

FIG. 4 is a flowchart which discloses the steps taken by the present invention when switching between input command signals. First, read switch control signal s (100). Next, read input signals r1 and r2 (110). Then, read feedback signals f1 and f2 (120).

Next, the output signal from summing junction S1, error signal e1, is calculated by taking the difference between input signal r1 and feedback signal f1 (200), e1=r1−f1. Similarly, the output signal from summing junction S2, error signal e2, is calculated by taking the difference between input signal r2 and feedback signal f2 (210), e2=r2−f2.

Next, execute compensator C1 algorithm based on error signal e1 and generate input signal a (220). Execute compensator C2 algorithm based on error signal e2 and generate input signal b (230).

Next, determine switch output signal c=a or c=b (310) according to the value of switch control signal s.

In step 400 and 410, the errors e3, e4 between output signal and input signals of switch SW1 are calculated. e3 is the difference between c and a, e3=c−a (400). e4 is the difference between c and b, e4=c−b (410).

In step 500, compensator K1 algorithm is executed based on the error signal e3 creating feedback signal f1 (510). Similarly, in step 520, compensator K2 algorithm is executed based on the error signal e4 creating feedback signal f2 (530). In a preferred embodiment, compensators K1 and K2 are dynamic compensators.

Implementation of the Smooth Transition Switch Using a Microprocessor

Figure 5:
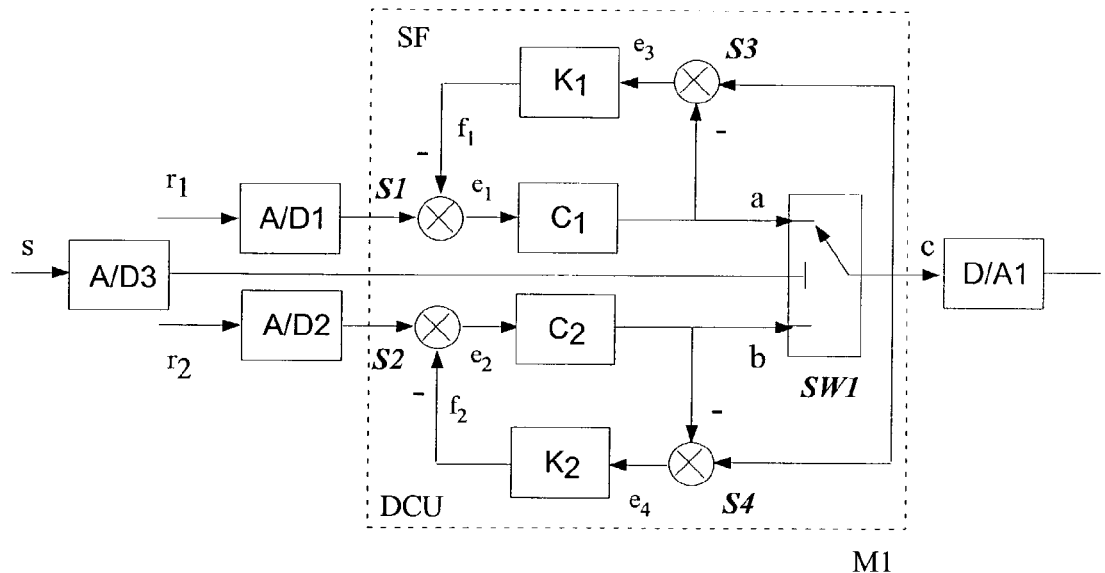
FIG. 5 is an implementation of the smooth transition switch using a microprocessor.
Figure 6:
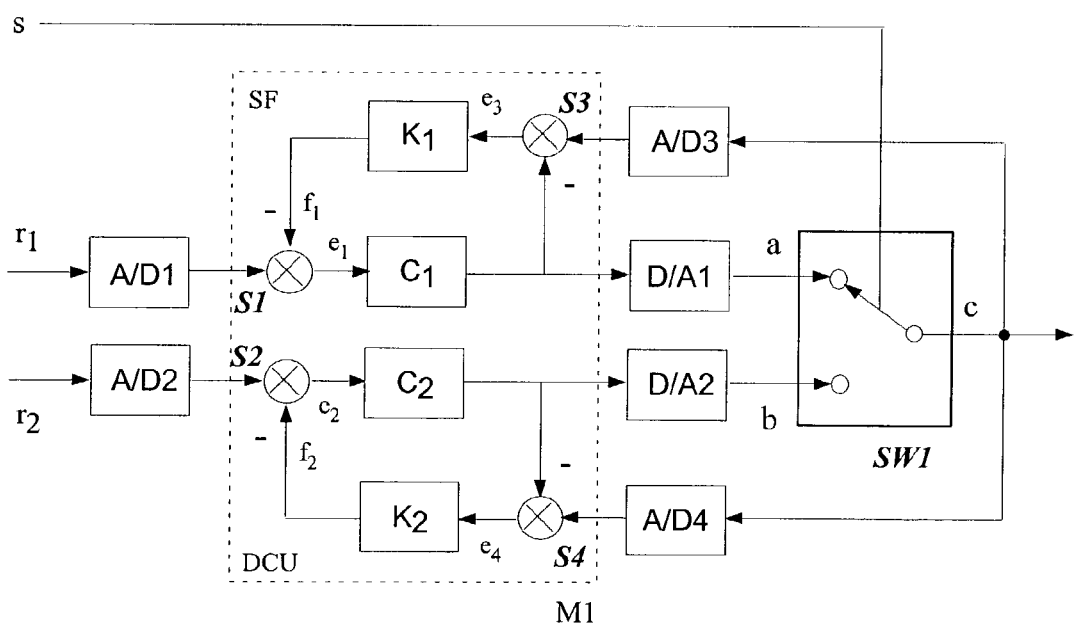
FIG. 6 is an implementation of the smooth transition switch using a microprocessor and a conventional analog switch.

This smooth transition switch with bumpless transfer can be implemented using both software and hardware. FIG. 5 illustrates an embodiment of the present invention using a microprocessor with A/D and D/A converters (analog to digital signal conversion and digital to analog signal conversion devices). FIG. 6 illustrates another embodiment of the present invention which uses a microprocessor with A/D and D/A converters and a conventional analog switch. Because FIGS. 5 and 6 include all of the elements for the controller illustrated in FIG. 3, a detailed description of the identical elements will not be provided in connection with FIGS. 5 and 6.

In FIG. 5, two analog switch input signals r1 and r2 are converted to digital signals by using analog/digital converters A/D1 and A/D2. The switch control signal s is also converted to a digital signal using analog/digital converter A/D3. The smooth transition switch of the present invention is implemented by executing software SF stored in the digital control unit (DCU) which is located in microprocessor M1. The software can be stored in RAM, ROM or any of storage medium compatible with the present invention. The digital output signal c of the digital control unit is then converted to an analog signal using digital/analog converter D/A1 to be an analog output of the switch.

In FIG. 6, two analog switch signals r1 and r2 are converted to digital signals by using analog/digital converters A/D1, A/D2. An analog switch output signal c is converted to the digital signals by using analog/digital converters A/D3, A/D4. Part of the smooth transition switch of the present invention is implemented by using software SF stored in the digital control unit DCU in the microprocessor M1. This part includes feedback compensators K1, K2, and forward-loop compensators C1, C2 as well as their signal summing junctions S1, S2, S3 and S4. The output signals of compensators C1, C2 are then converted to the analog signals using digital/analog converters D/A1 and D/A2 to be the input signals of a conventional analog switch SW1. The analog switch control signal s is forwarded directly to the conventional switch SW1. As it is mentioned above, the analog output signal c of the conventional switch SW1 is then converted to a digital signal using two analog/digital converter A/D3 and A/D4 to be input signals of summing junctions S3 and S4.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A smooth transition switch, comprising:
   a switch having at least one control input, a first signal input, a second signal input and at least one output; and
   at least one loop operably connected to said first signal input and said output, wherein said loop comprises:
   a first summing junction having a plurality of inputs and at least one output operably connected to said first signal input of said switch;
   a forward-loop compensator operably connected between said at least one output of said summing junction and said first signal input of said switch, wherein said forward-loop compensator is a simple proportional-integrate compensator;
   another summing junction having a first input operably connected to an output of said forward-loop compensator and a second input operably connected to said output of said switch;
   a feedback compensator operably connected between an output of said another summing junction and one of said inputs of said first summing junction; and
   a second loop operably connected to said second signal input and said output of said switch, wherein said forward-loop compensator is a signal processor, whereby said forward-loop compensator processes an error signal using an equation with transfer function $C(s)=(b1*s+b0)/(a1*s+1)$, where a1, b0 and b1 are constant coefficients and s is said control input; and
   said feedback compensator is a high gain compensator.

2. The smooth transition switch according to claim 1, wherein said second loop comprises:
   a second summing junction having a plurality of inputs and at least one output;
   a second forward-loop compensator operably connected between said at least one output of said second summing junction and said second signal input of said switch;
   a fourth summing junction having a first input operably connected to an output of said second forward-loop compensator and an input operably connected to said output of said switch; and
   a second feedback compensator operably connected between an output of said fourth summing junction and an input of said second summing junction.

3. The smooth transition switch according to claim 1, wherein at least one of said loops is a feedback loop, whereby a difference between an input signal and an output signal of said switch is fed to said input of said summing junction by said feedback compensator.

4. A smooth transition switch, comprising:
   a switch having at least one control input, a first signal input, a second signal input and at least one output; and
   at least one loop operably connected to said first signal input and said output wherein said loop comprises:
   a first summing junction having a plurality of inputs and at least one output operably connected to said first signal input of said switch;

a forward-loop compensator operably connected between said at least one output of said summing junction and said first signal input of said switch, wherein said forward-loop compensator is a simple proportional-integrate compensator;

another summing junction having a first input operably connected to an output of said forward-loop compensator and a second input operably connected to said output of said switch; and a feedback compensator operably connected between an output of said another summing junction and one of said inputs of said first summing junction, wherein said forward-loop compensator is a discrete signal processor, whereby said compensator processes an error signal using an equation with transfer function $C(s) = (b1*s+b0)/(a1*s+1)$, where at, b0 and b1 are constant coefficients and s is said control input; and said feedback compensator is a high gain compensator.

5. The smooth transition switch according to claim 4, further comprising a second loop operably connected to said second signal input and said output of said switch, wherein said loop comprises:

a second summing junction having a plurality of inputs and at least one output;

a second feed forward compensator operably connected between said at least one output of said second summer and said second signal of said switch;

a fourth summing junction having a first input operably connected to an output of said second forward-loop compensator and an input operably connected to said output of said switch; and a second feedback compensator operably connected between an output of said fourth summing junction and an input of said second summing junction.

6. The smooth transition switch according to claim 4, wherein said at least one loop is a feedback loop, whereby a difference between an input signal and an output signal of said switch is fed to said input of said first summing junction by said feedback compensator.

7. A method of smooth transition switching, comprising the steps of:

reading a switch control signal;
reading a plurality of switch input signals;
reading at least one feedback signal;
generating at least one error signal;
forward-loop compensating said at least one error signal using a forward-loop compensator;
generating at least one switch input command signal;
switching an output command signal to said at least one input command signal;
calculating another error signal between an output command signal and an input command signal;
feedback compensating said error signal using a feedback compensator; and
generating at least one feedback signal, wherein said step of forward-loop compensating said error signal comprises processing said error signal using an equation with transfer function $C(s)=(b1*s+b0)/(a1*s+1)$, where a1 b0 and b1 are constant coefficients and s is said control input.

8. The method of smooth transition switching according to claim 7, wherein said step of calculating said at least one error signal comprises the step of taking a difference between one of said input signals and said at least one feedback signal.

9. The method of smooth transition switching according to claim 7, wherein said step of calculating another error signal comprises taking a difference between said at least one input command signal and said output command signal.

10. The method of smooth transition switching according to claim 7, wherein said step of feedback compensating said error signal comprises applying a high gain compensator to said error signal.

11. The method of smooth transition switching according to claim 7, wherein said step of calculating said at least one error signal comprises the step of taking a difference between one of said input signals and said at least one feedback signal; and wherein said step of calculating another error signal comprises taking a difference between said at least one input command signal and said output command signal.

12. The method of smooth transition switching according to claim 7, wherein said step of calculating said at least one error signal comprises the step of taking a difference between one of said input signals and said at least one feedback signal;

wherein said step of calculating another error signal comprises taking a difference between said at least one command signal and said output command signal; and wherein said step of feedback compensating said error signal comprises applying a high gain compensator to said error signal.

* * * * *

UNITED STATES PATENT AND TRADEMARK OFFICE
CERTIFICATE OF CORRECTION

PATENT NO.         : 7,109,608 B2                                               Page 1 of 1
APPLICATION NO.    : 10/241124
DATED              : September 19, 2006
INVENTOR(S)        : Yixin Yao et al.

It is certified that error appears in the above-identified patent and that said Letters Patent is hereby corrected as shown below:

Column 4, line 45, "C(s)=b1*s+b0)/(a1*s+1)" should be --C(s)=(b1*s+b0)/(a1*s+1),--.

Column 6, line 64, Claim 4, after "output" insert --,--.

Column 8, line 12, Claim 7, after "a1" insert --,--.

Signed and Sealed this

Nineteenth Day of December, 2006

JON W. DUDAS
*Director of the United States Patent and Trademark Office*